(No Model.)
A. K. BONTA.
MEANS FOR ARRESTING MOTION OF ELECTRIC CARS.
No. 543,435. Patented July 23, 1895.
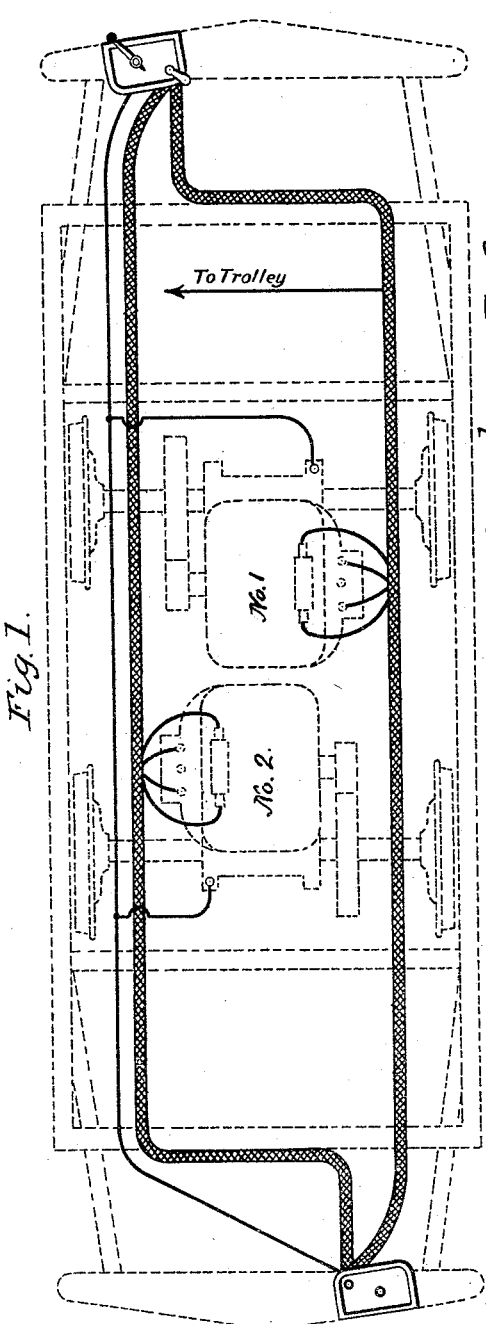
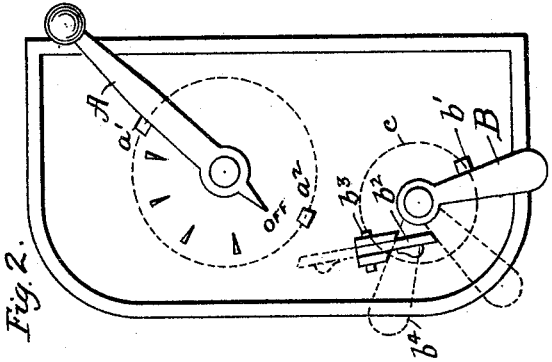
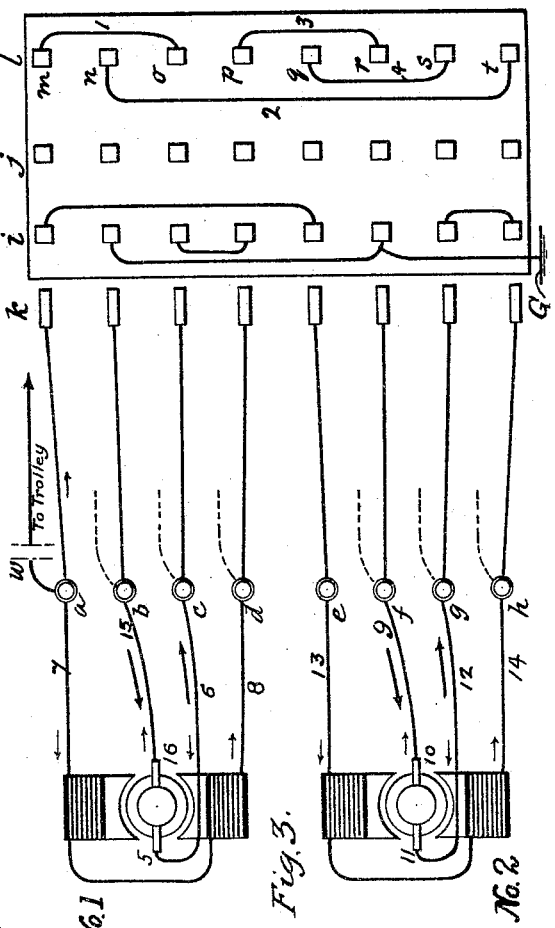
WITNESSES:
Frank S. Ober.
John Kraeger.
INVENTOR
Arthur K. Bonta
BY
Wm. A. Rosenbaum
ATTORNEY

UNITED STATES PATENT OFFICE.

ARTHUR K. BONTA, OF HOBOKEN, NEW JERSEY, ASSIGNOR TO THE BONTA MANUFACTURING COMPANY, OF SAME PLACE.

MEANS FOR ARRESTING MOTION OF ELECTRIC CARS.

SPECIFICATION forming part of Letters Patent No. 543,435, dated July 23, 1895.

Application filed March 21, 1895. Serial No. 542,638. (No model.)

*To all whom it may concern:*

Be it known that I, ARTHUR K. BONTA, a citizen of the United States, residing at Hoboken, in the county of Hudson and State of New Jersey, have invented certain new and useful Improvements in Methods of and Apparatus for Arresting Motion of Electric Cars, of which the following is a full, clear, and exact description.

This invention pertains to means for stopping or arresting electrically-propelled cars or checking their speed by means of their propelling-motors without employing the electricity from the supply-conductor or other source from which the propelling-current is derived. In United States Patent to S. H. Short, dated May 3, 1892, No. 474,031, one way of carrying out this method is described. It consists in disconnecting the motors from the source of propelling-current, reversing the relation of the armature and fields, and connecting them in a closed local circuit in such a manner that when they are rotated by the momentum of the car in a forward direction the electromotive force generated by each opposes that of the other and tends to produce a current in a direction to increase its own field-magnetism and cut down that of the other. One motor, (generator,) therefore, has the tendency to overpower the other, which it does after an indefinite interval, depending upon the difference of residual magnetism in the motors or upon the ability of one to build up or become magnetized faster than the other. The weaker motor has its field-polarity reversed by the stronger, and is thereafter operated as a motor in the direction to run the car backward by current supplied from the more powerful motor acting as a generator. From this it follows that when the motors are first thrown together in the local circuit their positive terminals are connected together and the negative terminals together, or, in other words, the motors are connected together in multiple. This method of arresting cars has been found to be very unreliable and often too slow in action to prevent the accidents which it is designed to avoid. The reason for this is that many times a pair of motors are so nearly alike or balanced magnetically and electrically that they will run a long time opposed to each other before one will overcome the other. Instances have been known, however, where the motors are so unlike that one will reverse the other quickly; but no dependence can be placed upon them, and the best and modern practice is to construct the motors as near alike as possible.

In accordance with my invention the motors are first disconnected from the feed-wire or source of propelling-current, and then a short local circuit is established in which is connected one or more of the propelling-motors. If only one motor is included therein, its field and armature connections are simultaneously reversed with respect to each other, and if two or more motors are included in the circuit the field and armature connections of each are reversed with respect to each other and the several motors are placed in series relation to one another—*i. e.*, with the positive pole of one motor connected with the negative pole of the next motor in the short circuit. With this method of connection the forward momentum of the car drives each motor as a generator, and the currents generated by all of them will be in the same direction through the circuit. Hence one motor, instead of opposing another, aids it, and the field-magnetism of all motors is increased alike. Motors operated as generators in this manner act instantly to retard the car, because the attraction between the fields and armatures which existed when the machines were operating as motors has become reversed by the change of polarity between the fields and armatures and the momentum of the car is consumed by the attraction between them tending to prevent the rotation of the armatures in the forward direction.

My method of stopping cars is much more rapid than that heretofore practiced, as above described, because it becomes effective the moment the connections are made, whereas by the old method it requires time for one machine to reverse the other.

In carrying out my invention, I place upon the motorman's platform a switch which I preferably combine with the regular car-controller. If a "series parallel" or other form of controller is used in which conductors from the several terminals of the motors are lead to the controller-stand, I utilize the same set of conductors for my closed local circuit, and it therefore is only necessary to provide on or near the controller-stand a suitable contact device to co-operate with the terminals of the group of conductors found in the controller-stand and with which the regular car-controlling contact devices also co-operate.

I will now describe my invention in detail with reference to the accompanying drawings, in which—

Figure 1 is a plan in dotted lines of the track and lower framework of the car, showing in full lines the cables extending from the motors to the controlling devices on the platforms. Fig. 2 is a plan of the top of one of the controller-stands. Fig. 3 is a diagram of circuits, showing how the connections are made to propel the car forward by its motors and also for arresting or stopping the car in accordance with my invention.

Electric cars are ordinarily controlled by a motorman who stands upon the forward platform and manipulates an electrical controller and a brake. The controller is operated by means of a lever attached to a cylinder adapted to be rotated step by step thereby, and thus alter the connections to the motors for stopping, starting, and varying the speed of the car. It is common to provide a second lever attached to a separate cylinder and having two running positions. This second lever is called the "reversing-lever," and when thrown into one of its positions the car may be started and moved forward at any speed by means of the controlling-lever, and when said reversing-lever is in its other position the car may be started and moved backward at any speed by the controlling-lever. To accomplish this reversal the cylinder connected with the reversing-lever is provided with two rows of contacts which are thrown into contact with a stationary row of fingers. The fingers are permanently connected by wires or otherwise with the brushes and field-magnet terminals of the two motors. When connection exists between the fingers and one row of contacts on the cylinder the circuits are such as to cause the motors to rotate in a certain direction, and when the fingers are in connection with the second row of contacts certain reversals of current are accomplished which cause the motors to rotate in the opposite direction.

In carrying out my invention I prefer to add to the reversing-cylinder a third row of contacts, which are adapted to be brought into connection with the fingers and thereby establish a short closed circuit, including the two motors in series.

Referring to the drawings, No. 1 and No. 2, respectively, represent the two motors. The conductors leading from the armature and field-magnet terminals to the controller-stand terminate therein on a connecting-board at the points $a$, $b$, $c$, $d$, $e$, $f$, $g$, and $h$, whence branches lead to the controlling and reversing cylinder hereinafter referred to. The wires from the brushes of motor No. 1 lead respectively to the points $b$ and $c$, while the field-terminals are represented by $a$ and $d$. The wires from the brushes of motor No. 2 lead respectively to the points $f$ and $g$, while the field-magnet terminals are indicated by $e$ and $h$.

In the plan of the top of the controller-stand, (indicated in Fig. 2,) A represents the starting, stopping, and speed-varying lever known in practice as the "controlling-lever." It is attached to and rotates a cylinder inside of the case. In the position in which the lever is shown the current is supposed to be cut off. Two stops $a'$ and $a^2$ are provided to limit its movement.

B represents the reversing-lever. When running in one direction this lever is against the stop $b'$, as indicated in full lines, and when running in the opposite direction the lever is against the stop $b^2$, as indicated in dotted lines.

For the purposes of my invention I make the stop $b^2$ adjustable by embodying it in the form of a short arm or lever pivoted at the fixed point $b^3$, and thus capable of being lifted to permit the reversing-lever to assume a third position. (Indicated by the dotted lines $b^4$.) In this third position the cylinder to which the lever is attached, and which is indicated by the dotted lines $c$, is at the position to establish contact between the fingers referred to and the third row of contact-points.

Referring now to Fig. 3, $i$ and $j$ respectively represent the ordinary two rows of contact-points used heretofore in practice. $k$ represents the stationary row of fingers adapted to be brought into connection with the contacts on the cylinder by rotating the latter. $l$ represents the third row of contacts, which I have added to the cylinder, and in it there are eight points corresponding respectively with the eight fingers $k$. These contacts are lettered respectively $m$, $n$, $o$, $p$, $q$, $r$, $s$, and $t$. The contacts $m$ and $o$ on the cylinder are permanently connected together by wire 1. Contacts $n$ and $t$ are connected together by wire 2. Contacts $p$ and $r$ are connected together by wire 3, and contacts $q$ and $s$ are connected together by wire 4. Branch wires from the eight terminals $a$, $b$, $c$, &c., of the motors lead respectively to the eight fingers $k$, while other branch wires (indicated in dotted lines) lead to the car-controlling devices.

In controllers of the class referred to, wherein a controlling and a reversing lever are used, it is customary to provide an interlocking device, whereby the reversing-lever may be held at the cut-off position. Such interlocking device, by a slight modification or addition, may be used, in connection with the improvement herein described, to prevent the third movement of the reversing-lever until the controlling-lever is at the cut-off position and to prevent the movement of the controlling-lever until the reversing-lever has been set to one of the running positions.

The operation is as follows: When the car is running forward under normal conditions, the row of contacts $i$ on the reversing-cylinder is in contact with fingers $k$, and assuming that the trolley-current enters at $a$ and the ground connection is at G then the current will flow through the fields and armatures of the motors in the directions indicated by the small arrows, the two motors operating in parallel and each rotating in a direction to send the car forward. Now, assume the car to be under headway on a downgrade and by accident or otherwise the regular brake mechanism fails to work and the car starts to "run away," or assume that a collision with a vehicle or a person is imminent and the car cannot be stopped quickly enough by ordinary means. In such instances and whenever a quick stop is desirable the motorman would have recourse to my improvement. He first throws the controlling-lever to the "off" position, and thus severs the car from the line entirely, as indicated at $w$. He then lifts the adjustable stop $b^2$ and swings the reversing-lever to the third position, bringing points $l$ into contact respectively with fingers $k$, thus establishing a short complete circuit including the two car motors in series with each other and with the armature-terminals of each motor reversed. The momentum of the car keeps the motors rotating in the same forward direction, and thus both machines are converted into generators, and inasmuch as their armature-leads have been reversed and they are connected in series with each other the current generated by each machine will leave its armature in the opposite direction to which it did when the machines were running as motors, and we trace the current as follows: starting at brush 5 of No. 1 machine we have current flowing from the armature by wire 6, contact $o$, wire 1, contact $m$, wire 7, field-magnet of No. 1 machine, wire 8, contact $p$, wire 3, contact $r$, wire 9, brush 10 of No. 2 machine, armature, brush 11, wire 12, contact $s$, wire 4, contact $q$, wire 13, field-magnet of No. 2 machine, wire 14, contact $t$, wire 2, contact $n$, and finally by wire 15 to brush 16 and into the armature and brush 5. It will thus be seen that the current generated by each machine traverses the fields of both in the same direction that the propelling-current formerly did and builds up or strengthens them; but in the armatures the current is reversed, as indicated by the heavy arrows. This results in an attraction between the armature and field-magnets of each machine in a direction to hold back or stop the car. The current generated in this closed circuit is immediately very great, and a car moving at a high speed will be stopped within a few feet if on a level, and if on a grade will slow down to a creeping pace.

The primary use for which this invention is designed is to prevent accidents on grades. Many instances are recorded of brakes giving out on downgrades and the high speed or vibration of the car throwing the trolley off, thus rendering ineffective the practice which motormen are instructed to resort to—to wit, reversing the motors. When the trolley is off the wire, the main current is not available as a power to stop the car; but by my invention the retarding-power is generated automatically by and in direct proportion to the speed of the car. In this connection it should be pointed out that by my invention, if the efficiency of the motors was one hundred per cent. and the traction was perfect, the car would be stopped instantly, but as such conditions do not exist in practice the car will be stopped in the quickest possible time.

It is obvious that the third row $l$ of contacts on the reversing-cylinder may be placed upon a separate cylinder and operated by means of an independent handle. It is also obvious that my switching apparatus is not confined to a combination with the particular type of controller herein referred to. It will be observed that the type of controller herein referred to operates to vary the speed by altering the connections of the field-coils of the motors, and this is the most modern and approved form of controller. It, however, necessarily involves running a large number of wires between the controller-stand and the motors. In applying my invention to this particular controller I utilize these extra wires for the short circuit which it involves and do not find it necessary to add any apparatus whatever beyond the row of contacts $g$, the adjustable stop $b^2$ not being essential, although useful. In consequence of this I am able to equip a car with my invention at a very small expense.

I may add that inasmuch as this invention is designed as a safety device to prevent accidents and not as a graduating-brake the short circuit into which the motor or motors are thrown should not contain any other translating device or substantial resistance, either fixed or variable, for the reason that any such device or resistance would defeat the very object of the invention—to wit, to stop the car in the shortest possible period.

Having thus described my invention, I claim—

1. In an electric car the combination of a propelling motor or motors, a controller stand located on the motorman's platform and containing a car controlling switch and a separate reversing switch the latter consisting of a cylinder having three sets of contact points thereon and a set of stationary fingers or terminals with which said sets of contact points are adapted to engage; one set establishing connections to send the car forward, another set to send the car backward, and the third set to reverse the relation of the field magnet and armature connections and establish a closed local circuit in which the terminals of the motor or motors, will be connected in series, substantially as described.

2. In an electric car the combination of a propelling motor or motors, a controller stand located on the motorman's platform and containing a car controlling switch and a separate car reversing switch, the latter consisting of a cylinder having three sets of contact points thereon and a set of stationary fingers or terminals with which said sets of contact points are adapted to engage, one set establishing connections to send the car forward, another set to send the car backward, and the third set to establish a closed local circuit in which the terminals of the motor or motors will be connected together for the purpose set forth.

3. In an electric car, the combination of two propelling motors, a controller stand located on the motorman's platform, said controller stand containing two circuit changing cylinders; one for reversing, and one for varying the speed, a short circuit including both motors in series, a circuit controller for said short circuit, located upon said reversing cylinder, and a lever for operating said reversing cylinder, the lever having two stops one of which is adjustable.

4. In an electric car, two propelling motors, a controller stand located on the motorman's platform, a controller located in said stand and conductors leading from the motors to terminals on said stand whereby the speed of the motors may be changed, all in combination with a reversing switch located in said stand and controlling the course of the current over said conductors, the reversing switch having extra contacts by means of which the motors may be thrown into series in a closed local circuit, substantially as described.

5. In an electric car, two propelling motors, a controller stand located on the motorman's platform, a controller located in said stand and conductors leading from the motors to terminals on said stand whereby the speed of the motors may be changed, all in combination with a reversing switch located in said stand and controlling the course of the current over said conductors, the reversing switch having extra contacts by means of which the motors may be thrown into series in a closed local circuit which local circuit includes the said conductors leading from the motors to the controlling stand.

In testimony whereof I subscribe my signature in presence of two witnesses.

ARTHUR K. BONTA.

Witnesses:
FRANK S. OBER,
WM. A. ROSENBAUM.